(12) United States Patent
Kishi

(10) Patent No.: US 8,302,066 B2
(45) Date of Patent: Oct. 30, 2012

(54) CLOCK JITTER SUPPRESSION METHOD AND COMPUTER-READABLE STORAGE MEDIUM

(75) Inventor: Kotaro Kishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/004,577

(22) Filed: Jan. 11, 2011

(65) Prior Publication Data

US 2011/0176597 A1    Jul. 21, 2011

(30) Foreign Application Priority Data

Jan. 20, 2010    (JP) ................................. 2010-009672

(51) Int. Cl.
*G06F 17/50*    (2006.01)
(52) U.S. Cl. ........................ 716/136; 716/100
(58) Field of Classification Search ......... 716/100–102, 716/136
See application file for complete search history.

(56) References Cited

U.S. PATENT DOCUMENTS 7,509,608 B1 *   3/2009  Duong ......................... 716/113

FOREIGN PATENT DOCUMENTS

| JP | 01-206438 A | 8/1989 |
| JP | 04-115634 A | 4/1992 |
| JP | 07-131025 A | 5/1995 |

* cited by examiner

*Primary Examiner* — Jack Chiang
*Assistant Examiner* — Binh Tat
(74) *Attorney, Agent, or Firm* — Fujitsu Patent Center

(57) ABSTRACT

A value held in storage elements coupled to a clock buffer and variably set with a threshold voltage is read out in a state where an analyzing target circuit within an IC operates. An analyzing process specifies an impact of noise in a power supply or ground voltage of the clock buffer and a location where the impact is large, based on the threshold voltage and position information of the storage element from which the read out value has an inverted relationship to the set logic value and each storage element that is a read target. A constraint condition for placement of constituent elements of the IC and routing therein is created from results of the analyzing process, and a re-placement or re-routing process re-places or re-routes the constraint condition to reduce the noise.

11 Claims, 10 Drawing Sheets

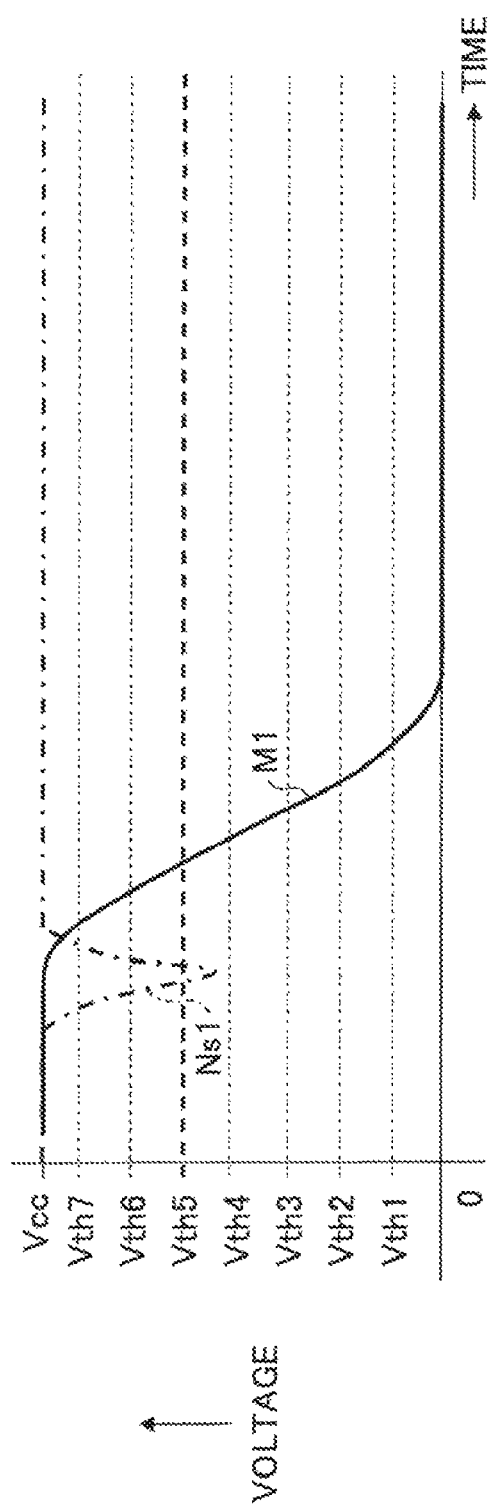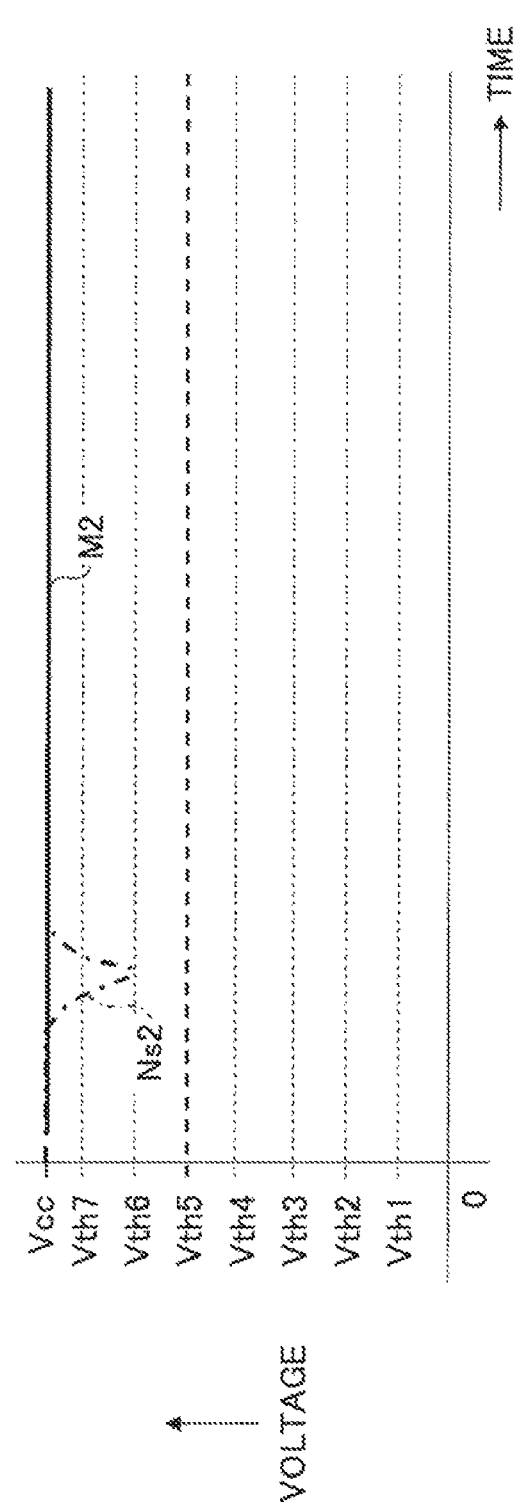
FIG.6
FIG.7

CLOCK JITTER SUPPRESSION METHOD AND COMPUTER-READABLE STORAGE MEDIUM

CROSS-REFERENCE TO RELATED APPLICATIONS

This application is based upon and claims the benefit of priority of the prior Japanese Patent Application No. 2010-009672, filed on Jan. 20, 2010, the entire contents of which are incorporated herein by reference.

FIELD

Embodiments discussed herein are related to clock jitter suppression methods, and a computer-readable storage medium which stores a program which when executed by a computer causes the computer to perform a process of such a clock jitter suppression method.

BACKGROUND

In the conventional programmable device, in a case where the utilization rate of internal elements is relatively high and a simultaneous operation rate with which the internal elements operate simultaneously is relatively high, noise may be generated in the internal power supply or ground. A threshold value of a clock buffer that is connected to a clock line within the programmable device may be affected by such noise and change, to thereby cause clock jitter. When the clock jitter is generated, a designed external AC characteristic may not be obtained. As a result, an appropriate signal transfer may not be possible between the programmable device and an external device or, a timing error may occur among registers of the internal circuit of the programmable device. When outputting data from the programmable device to the external device, there is an output timing to be satisfied in order to make the signal transfer while keeping the time required for the data to stabilize depending on changes in the data and the clock. Such an output timing may be achieved when the designed external AC characteristic is obtained.

Conventionally, when developing a platform, that is, an application of the programmable device, a noise reduction technique that embeds capacitors for noise reduction into the programmable device is employed by the design using CAD (Computer Aided Design). However, the noise anticipated by this noise reduction technique is for an average application. For this reason, if the capacitors for noise reduction, that may cope with all applications, were to be embedded in the programmable device, the capacitors would occupy a relatively large area within the programmable device, and the cost of the programmable device would increase. Hence, this noise reduction technique is not very practical. On the other hand, in SPICE (Simulation Program with Integrated Circuit Emphasis) that can compute the extent of the effect of the noise, the amount of capacitors required for noise reduction may be obtained from the amount of noise by carrying out a chip simulation for each application. However, this chip simulation requires an extremely long time and an extremely large number of hardware resources, and the cost of this chip simulation is extremely high. Hence, the technique that uses this chip simulation is also not very practical.

On the other hand, in order to operate the platform, that is, the application of the programmable device, it is necessary to increase the amount of capacitors for noise reduction required within the programmable device if an evaluation result of the actual programmable device indicates that the effect of the noise is relatively large. But in order to increase the amount of capacitors for noise reduction, it becomes necessary to re-develop the platform, and additional time and cost are required for the re-development or re-designing.

Therefore, when designing the programmable device, there are demands to use the platform of the existing programmable device, to avoid the increase in cost caused by the re-development, simulation and the like, and to suppress the clock jitter by specifying the location within the programmable device where the effect of the noise is relatively large or the effect of the noise may not be negligible.

Similar methods are disclosed in Japanese Laid-Open Patent Publications No. 7-131025, No. 1-206438, and No. 4-115634.

According to the conventional method of designing the semiconductor integrated circuit, such as the programmable device, there was a problem in that it is difficult to positively suppress the clock jitter in a relatively short time and at a relatively low cost.

SUMMARY

According to one aspect of the present invention, there is provided a clock jitter suppression method for suppressing clock jitter in a semiconductor integrated circuit having a clock buffer configured to receive a clock, comprising setting an arbitrary logic value to storage elements that are coupled to the clock buffer; variably setting a threshold voltage of the storage elements; reading a value held in the storage elements in a state where an analyzing target circuit within the semiconductor integrated circuit operates; performing an analyzing process to specify an extent of an effect of noise in a power supply voltage or a ground voltage of the clock buffer and to specify a location where the effect of the noise is greater than or equal to a predetermined amount within the semiconductor integrated circuit, based on the threshold voltage and position information of the storage element from which the read out value has an inverted relationship to the set arbitrary logic value and each storage element that is a read target; performing a constraint condition creating process to create a constraint condition for placement of constituent elements of the semiconductor integrated circuit and routing within the semiconductor integrated circuit based on results of the analyzing process; and performing one of a re-placement process to modify and re-place the placement of the constraint condition and a re-routing process to modify and re-route the routing of the constraint condition, in order to reduce the noise.

According to another aspect of the present invention, there is provided a computer-readable storage medium that stores a program which, when executed by a computer, causes the computer to perform a process of suppressing clock jitter in a semiconductor integrated circuit having a clock buffer configured to receive a clock, the process comprising a setting procedure causing the computer to set an arbitrary logic value to storage elements that are coupled to the clock buffer; a variably setting procedure causing the computer to variably set a threshold voltage of the storage elements; a reading procedure causing the computer to read a value held in the storage elements in a state where an analyzing target circuit within the semiconductor integrated circuit operates; an analyzing procedure causing the computer to perform an analyzing process to specify an extent of an effect of noise in a power supply voltage or a ground voltage of the clock buffer and to specify a location where the effect of the noise is greater than or equal to a predetermined amount within the semiconductor integrated circuit, based on the threshold voltage and position information of the storage element from which the read out value has an inverted relationship to the set arbitrary logic value and each storage element that is a read target; a creating procedure causing the computer to perform a constraint condition creating process to create a constraint condition for placement of constituent elements of the semiconductor integrated circuit and routing within the semiconductor integrated circuit based on results of the analyzing process; and a performing procedure causing the computer to perform one of a re-placement process to modify and re-place the placement of the constraint condition and a re-routing process to modify and re-route the routing of the constraint condition, in order to reduce the noise.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 6 is a diagram for explaining a change in a value held in the monitoring storage element in a case where logic elements in a vicinity of a clock buffer are used for an operation of a FPGA (Field Programmable Gate Array);

FIG. 7 is a diagram for explaining a change in a value held in the monitoring storage element in a case where the logic elements in the vicinity of the clock buffer are not used for the operation of the FPGA;

DESCRIPTION OF EMBODIMENTS

Preferred embodiments of the present invention will be described with reference to the accompanying drawings.

In this specification, the clock jitter includes a time error caused by a delay in a rising edge or a falling edge of a clock, a time error caused by a change in the phase of the clock, and the like.

According to one aspect of the present invention, there is disclosed a clock jitter suppression method and a computer-readable storage medium that suppresses clock jitter in a semiconductor integrated circuit having a clock buffer that receives a clock input. An arbitrary logic value is set in a storage element that is coupled to the clock buffer, a threshold voltage of the storage element is variably set, and the value of the storage element is read out in a state where a target circuit that is an analyzing target within the semiconductor integrated circuit operates. An analyzing process is carried out to specify an extent of the effect of noise (or an impact of noise) in a power supply voltage or a ground voltage of the clock buffer and to specify a location where the effect of the noise is greater than or equal to a predetermined amount within the semiconductor integrated circuit, based on the threshold voltage and position information of the storage element from which the read out value has an inverted relationship to the set arbitrary logic value and each storage element that is a read target. Based on results of the analyzing process, a constraint condition creating process is carried out to create a constraint condition for placement of constituent elements of the semiconductor integrated circuit and routing within the semiconductor integrated circuit. The clock jitter of the semiconductor integrated circuit is suppressed by carrying out a re-placement process that modifies and re-places the placement of the constraint condition so that the noise is reduced or, by carrying out a re-routing process that modifies and re-routes the routing of the constraint condition.

A description will now be given of the clock jitter suppression method and the computer-readable storage medium in each embodiment according to the present invention.

Figure 1:
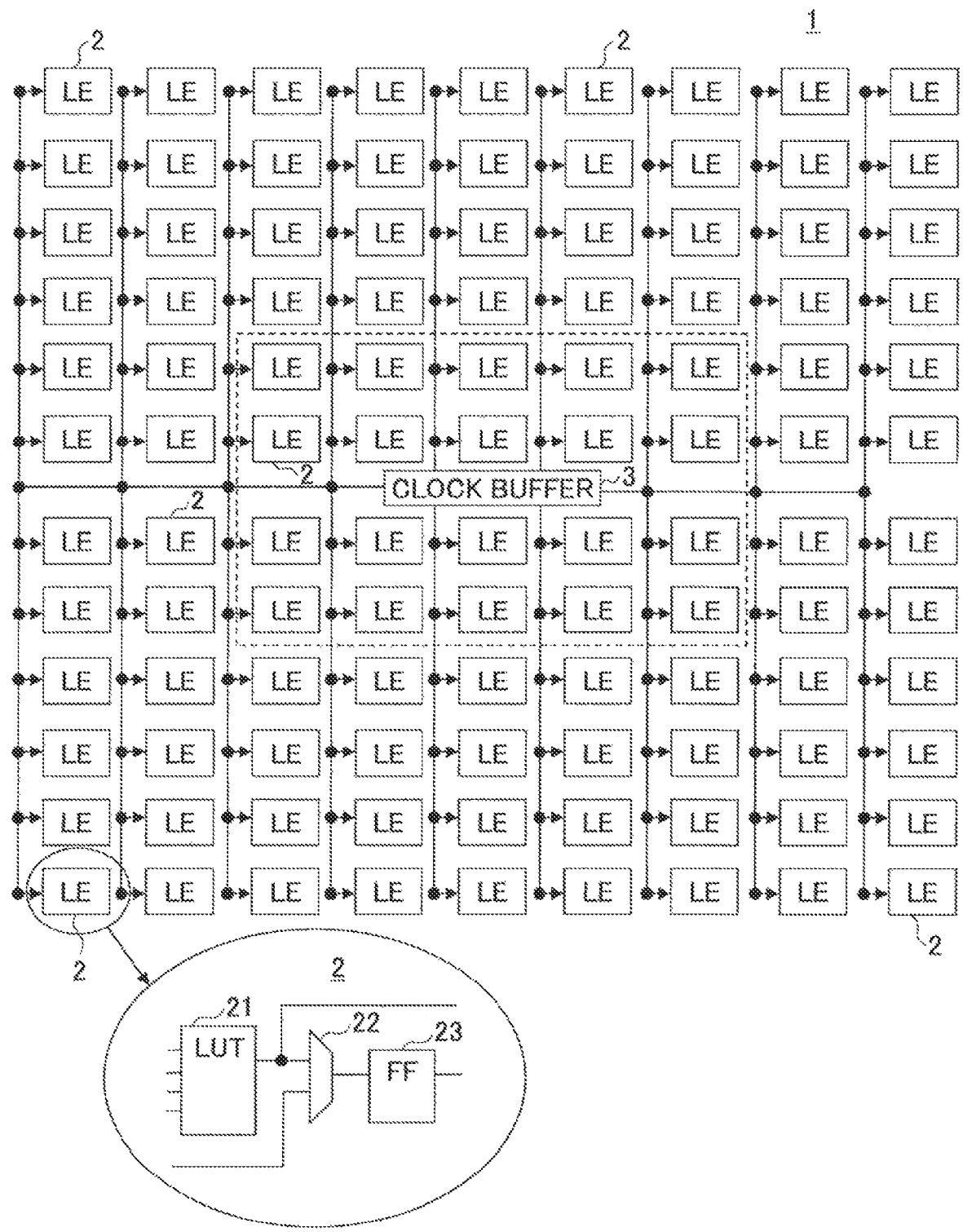
FIG. 1 is a diagram for explaining a part of a programmable device in one embodiment of the present invention.

FIG. 1 is a diagram for explaining a part of a programmable device in one embodiment of the present invention. In this embodiment, the present invention is applied to a FPGA (Field Programmable Gate Array), which is an example of the semiconductor integrated circuit.

As illustrated in FIG. 1, a FPGA 1 includes a plurality of LEs (Logic Elements) 2 that are arranged in a matrix, and a clock buffer 3. In this example, it is assumed for the sake of convenience that only one clock buffer 3 is provided, however, it is of course possible to provide a plurality of clock buffers 3 within the FPGA 1. In FIG. 1, the illustration of monitoring storage elements, data lines, and the like which will be described later will be omitted. As illustrated on an enlarged scale at a bottom left portion of FIG. 1, each LE 2 includes a LUT (Look-Up Table) 21, a selector 22, and a FF (Flip-Flop) 23.

Figure 2:
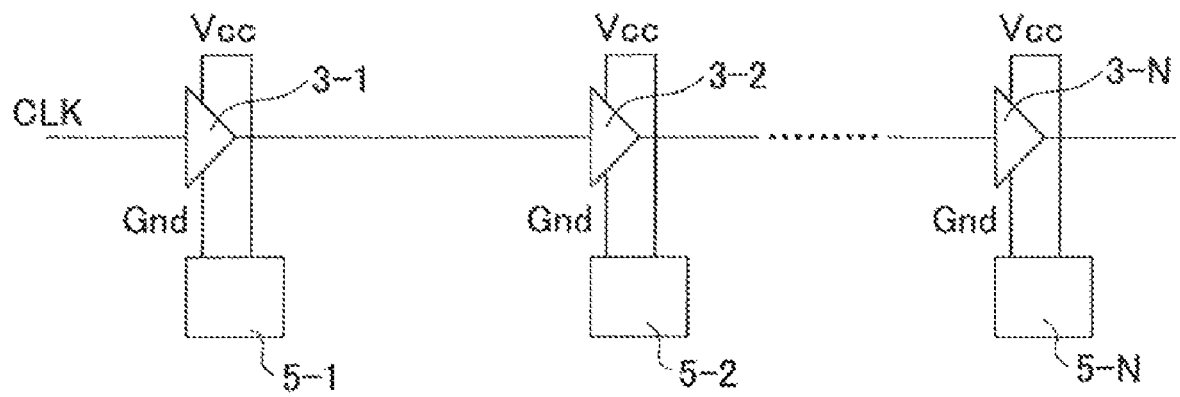
FIG. 2 is a diagram for explaining monitoring storage elements.

FIG. 2 is a diagram for explaining monitoring storage elements. In the example illustrated in FIG. 2, N (N is a natural number greater than or equal to 1) monitoring storage elements 5-1 through 5-N are arranged in vicinities of and are connected to N corresponding clock buffers 3-1 through 3-N. Each of the clock buffers 3-1 through 3-N has the same structure, and each of the monitoring storage elements 5-1 through 5-N has the same structure. In FIG. 2, CLK denotes a clock input to each of the monitoring storage elements 5-1 through 5-N, Vcc denotes a power supply voltage, and Gnd denotes a ground voltage.

Figure 3:
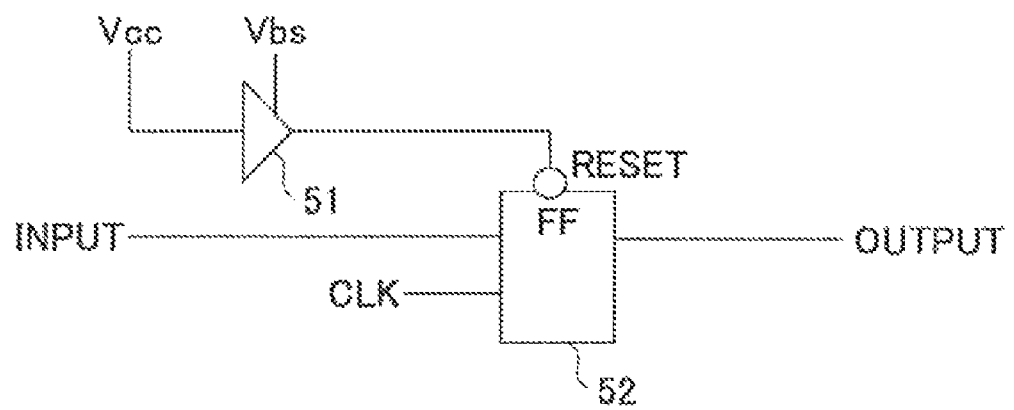
FIG. 3 is a circuit diagram illustrating an example of the structure of the monitoring storage element.

FIG. 3 is a circuit diagram illustrating an example of the structure of the monitoring storage element. A monitoring storage element 5 illustrated in FIG. 3 may be used for each of the monitoring storage elements 5-1 through 5-N illustrated in FIG. 2. The monitoring storage element 5 includes a buffer 51 that is applied with the power supply voltage Vcc of the clock buffer and a reverse bias voltage Vbs, and a FF (Flip-Flop) 52 having a reset terminal applied with an output of the buffer 51. The power supply voltage Vcc of the clock buffer 3 is input to the reset terminal of the FF 52 via the buffer 51 which has a resistance, in the monitoring storage element 5. In addition, the monitoring storage element 5 has a function of varying a threshold voltage Vth depending on the reverse bias voltage Vbs applied to the buffer 51. In other words, the threshold voltage Vth is variable. For example, an arbitrary logic value is input to the FF 52 in an initial state of the FPGA 1, and is held and set in the FF 52 in response to the clock CLK. That is, the input and output of the FF 52 corresponds to the input and output of the monitoring storage element 5. Of course, the structure of the monitoring storage element 3 is not limited to the structure illustrated in FIG. 3, and any suitable structure may be employed as long as the threshold voltage Vth is variable.

Instead of providing the monitoring storage element 5 with respect to each of the clock buffers 3 within the FPGA 1, the monitoring storage element 5 may be provided only with respect to specific clock buffers 3. In addition, the logic value may be held and set only with respect to the monitoring storage element 5 within an analyzing target region, amongst the monitoring storage elements 5 that are provided with respect to all or some of the clock buffers 3 within the FPGA 1. In this case, the logic value may be read out only from the monitoring storage element within the analyzing target region in the state where the FPGA 1 operates.

Figure 4:
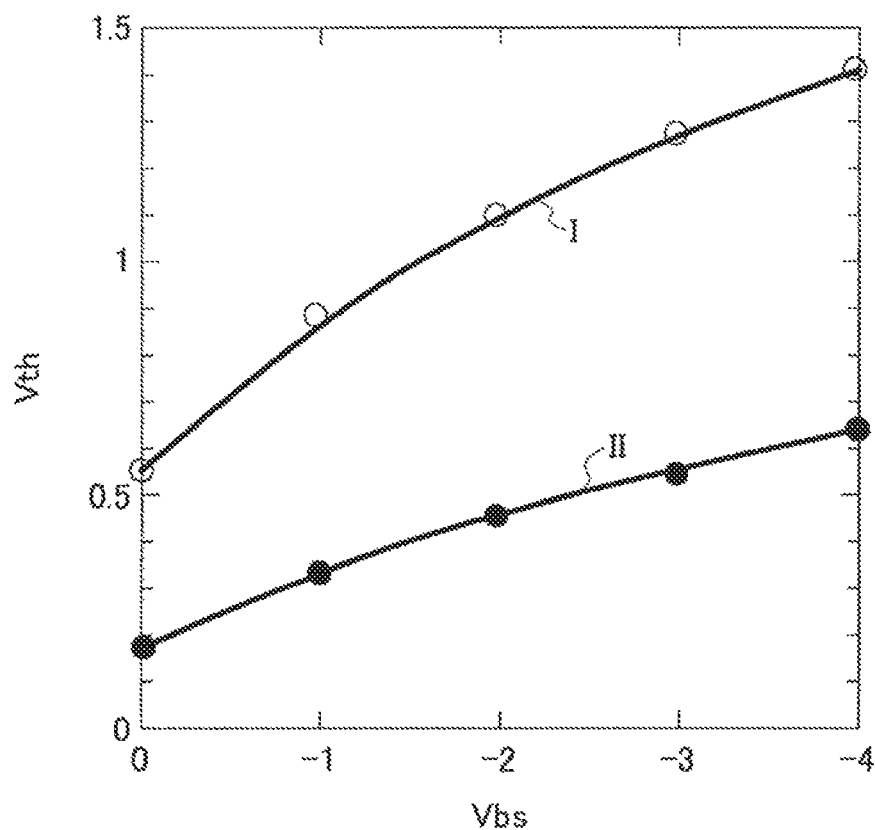
FIG. 4 is a diagram illustrating an example of a relationship between a reverse bias voltage and a threshold voltage.

FIG. 4 is a diagram illustrating an example of a relationship between the reverse bias voltage Vbs and the threshold voltage Vth. In FIG. 4, the ordinate indicates the threshold voltage Vth of the monitoring storage element 5 in arbitrary units, and the abscissa indicates the reverse bias voltage Vbs applied to the buffer 51 of the monitoring storage element 5 in arbitrary units. A relationship I illustrated in FIG. 4 illustrates a case where an impurity concentration of a semiconductor substrate is high compared to that of a relationship II. As may be seen from the relationships I and II in FIG. 4, the threshold voltage Vth increases as the reverse bias voltage Vbs increases. The relationships I and II illustrated in FIG. 4 may be known from the Japanese Laid-Open Patent Publication No. 7-131025, for example.

Figure 5:
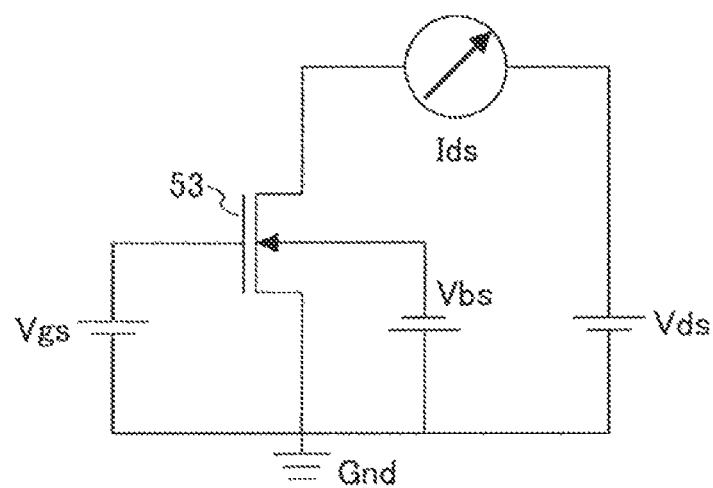
FIG. 5 is a diagram illustrating a model for a case where a buffer is formed by a MOS transistor.

FIG. 5 is a diagram illustrating a model for a case where the buffer 51 is formed by a MOS transistor 53. In FIG. 5, Ids denotes a drain-source current, Vgs denotes a gate-source voltage, Vds denotes a drain-source voltage, and Vbs denotes the reverse bias voltage.

A reverse bias power supply (not illustrated) that supplies the reverse bias voltage Vbs that is variable is separate from a power supply (not illustrated) that supplies the power supply voltage Vcc of the clock buffer 3. Hence, when the clock buffer 3 receives the effect of the noise generated in the power supply voltage Vcc (or the ground voltage Gnd), the voltage within the monitoring storage element 5 becomes less than the threshold voltage Vth, and the logic value held in the monitoring storage element 5 is inverted (or reversed).

FIG. 6 is a diagram for explaining a change in the value held in the monitoring storage element 5 in a case where the LEs 2 in a vicinity of the clock buffer 3, including all LEs 2 surrounded by a dotted line in FIG. 1, are used for the operation of the FPGA 1. In FIG. 6, the ordinate indicates the voltage in arbitrary units, and the abscissa indicates the time in arbitrary units. In this example, it is assumed for the sake of convenience that the threshold voltage Vth of the monitoring storage element 5 is set to Vth5 by applying an appropriate reverse bias voltage Vbs to the buffer 51. In this case, when the clock buffer 3 receives the effect of noise Ns1 which is generated in the power supply voltage Vcc but is less than the threshold voltage Vth5, a voltage M1 within the monitoring storage element 5 (that is, the buffer 51) becomes less than the set threshold voltage Vth5, and thus, the logic value held in the monitoring storage element 5 is inverted. In FIG. 6, the noise Ns1 is indicated by a one-dot chain line.

FIG. 7 is a diagram for explaining a change in the value held in the monitoring storage element 5 in a case where the LEs 2 in the vicinity of the clock buffer 3, including all LEs 2 surrounded by the dotted line in FIG. 1, are not used for the operation of the FPGA 1. In FIG. 7, the ordinate indicates the voltage in arbitrary units, and the abscissa indicates the time in arbitrary units. In this example, it is assumed for the sake of convenience that the threshold voltage Vth of the monitoring storage element 5 is set to Vth5 by applying an appropriate reverse bias voltage Vbs to the buffer 51. In this case, noise Ns2 which is generated in the power supply voltage Vcc will not become less than a threshold voltage Vth6, because the LEs 2 in the vicinity of the clock buffer 3 are not used during the operation of the FPGA 1. For this reason, even if the clock buffer 3 receives the effect of the noise Ns2 which is generated in the power supply voltage Vcc and has the threshold voltage Vth6, a voltage M2 within the monitoring storage element 5 (that is, the buffer 51) will not become less than the set threshold voltage Vth5, and thus, the logic value held in the monitoring storage element 5 will not be inverted. In FIG. 7, the noise Ns2 is indicated by a one-dot chain line.

Accordingly, by holding and setting the arbitrary logic value in the monitoring storage element 5 in advance, and setting the threshold voltage Vth by applying the appropriate reverse bias voltage Vbs to the buffer 51, and thereafter operating the FPGA 1 before reading out the value of the monitoring storage element 5, it becomes possible to carry out an analyzing process that may specify the extent of the effect of the noise (or the impact of noise) and specify the location where the effect of the noise is greater than or equal to a predetermined amount within the FPGA 1. In addition, with respect to the LEs 2 that are not used for the operation of the FPGA 1, the effect on the noise analysis when these LEs 2 are used for the operation of the FPGA 1 may be suppressed in a relatively simple manner. Hence, an accurate analyzing process may be carried out in a relatively short time at a relatively low cost. The process of holding and setting the arbitrary logic value in each monitoring storage element 5 in advance, and the process of thereafter operating the FPGA 1 and reading out the value of each monitoring storage element 5 may respectively be carried out by a known method.

A constraint condition creating process may be carried out to create the constraint condition of the placement of the constituent elements of the FPGA 1 and the routing (or wiring) within the FPGA 1, based on the results of the analyzing process. A re-placement process may be carried out to modify and re-place the placement of the constraint condition that is already determined or, a re-routing process may be carried out to modify and re-route the routing of the constraint condition that is already determined, based on the results of the analyzing process, in order to reduce the noise. By carrying out such processes, the noise source may be placed farther away from the vicinity of the monitoring storage element 5 that is easily affected by the noise, in order to positively suppress the clock jitter of the FPGA 1 in a relatively short time at a relatively low cost.

Figure 8:
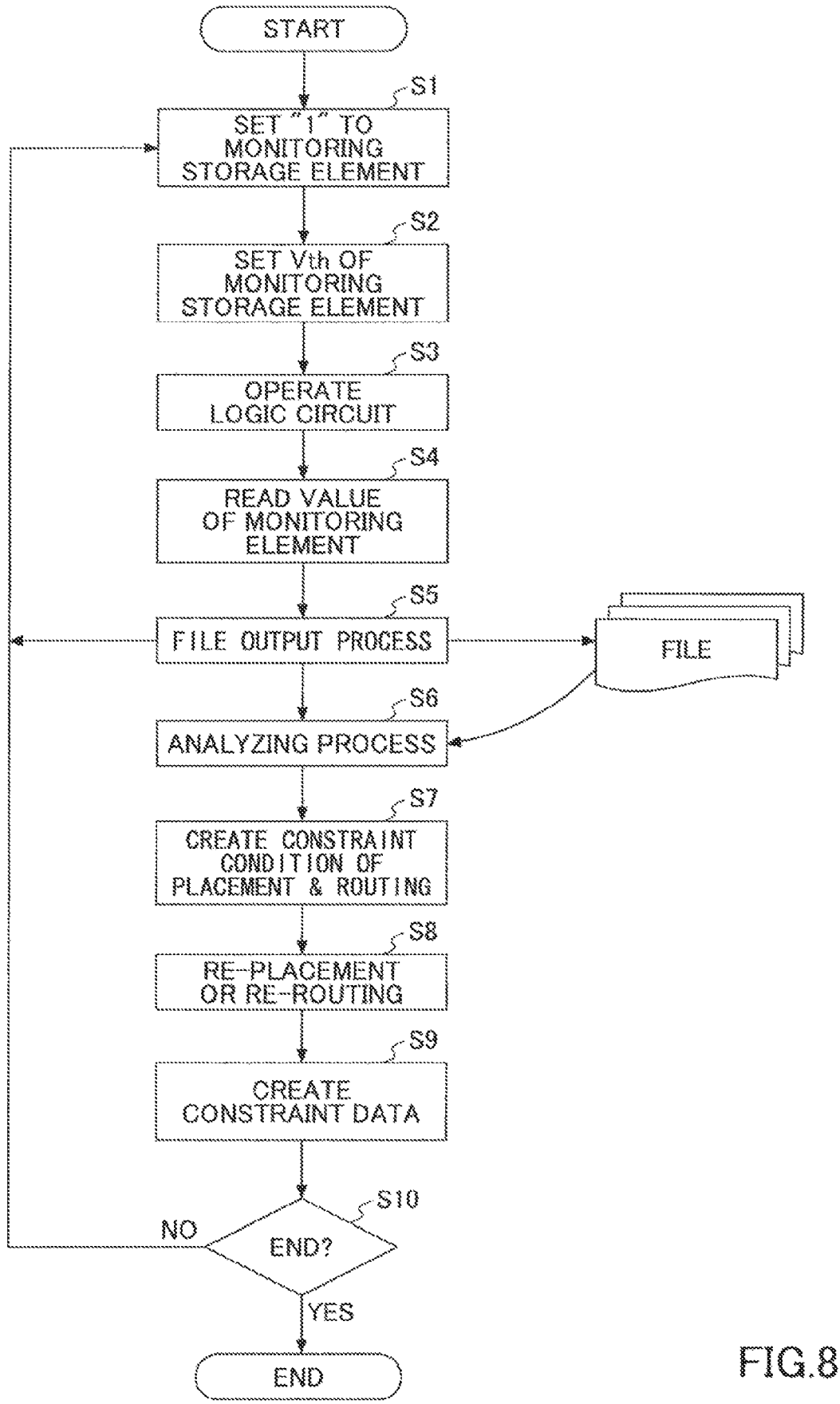
FIG. 8 is a flow chart for explaining a processing procedure of the clock jitter suppression method in the embodiment.

Next, a description will be given of the processing procedure of the clock jitter suppression method of this embodiment, by referring to FIG. 8. FIG. 8 is a flow chart for explaining the processing procedure of the clock jitter suppression method in this embodiment. The processing procedure illustrated in FIG. 8 may form a part of a method of designing the semiconductor integrated circuit, such as the FPGA 1, or, form a part of a method of producing (or fabricating) the semiconductor integrated circuit, such as the FPGA 1.

In FIG. 8, a step (or process or procedure) S1 sets the logic value "1" (or the logic value "0") to each monitoring storage element 5 within the FPGA 1, from an external apparatus (not illustrated) that is coupled to the FPGA 1. This external apparatus may be formed by a general-purpose computer that includes a processor, such as CPU (Central Processing Unit), and a storage part. The setting of the logic value to each monitoring storage element 5 in the step S1 may be carried out in a manner similar to the writing of data to a general programmable device. The FPGA 1 that is subjected to the analyzing process in this example is a semiconductor integrated circuit (or semiconductor chip) for testing that is created based on the design by the CAD or the like. A step S2 applies the appropriate reverse bias voltage Vbs to each monitoring storage element 5 within the FPGA 1, from the external apparatus, in order to variably set the threshold voltage Vth of each monitoring storage element 5. By varying the set value of the threshold voltage Vth, the transistor forming the buffer 51 of the monitoring storage element 5 reacts depending on the amount of noise in the power supply voltage Vcc (or the ground voltage Gnd) and rewrites the logic value held in the monitoring storage element 5, so that the amount of noise and the threshold voltage Vth (or the reverse bias voltage Vbs) are related to each other.

A step S3 operates a logic circuit that is an analyzing target (hereinafter referred to as an analyzing target logic circuit) and is formed by arbitrary LEs 2 within the FPGA 1, from the external apparatus. A step S4 reads out the logic value set (that is, held) in each monitoring storage element 5 at least within the analyzing target region of the FPGA 1, from the external apparatus. The analyzing target region is within the analyzing target logic circuit or, in a vicinity of the analyzing target logic circuit. By operating the analyzing target logic circuit in the step S3, the step S4 may measure the effect of the noise that is actually generated within the analyzing target region.

Of course, the process of the steps S1 through S3 may be performed manually by an operator.

Figure 9:
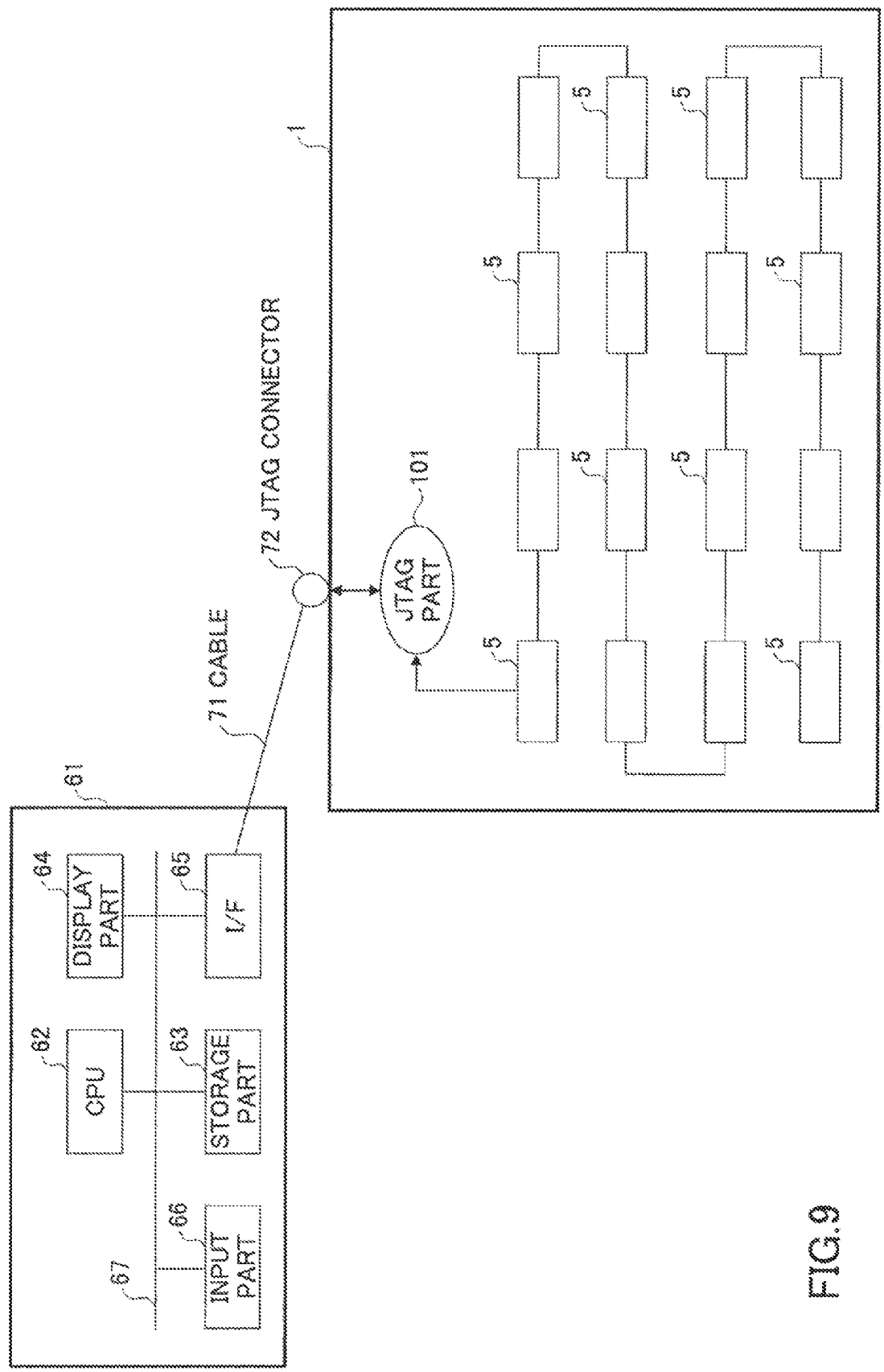
FIG. 9 is a diagram for explaining read out of a logic value held in the monitoring storage element.

The logic value held in each monitoring storage element 5 within the analyzing target region may be read out in the step S4 according to a method illustrated in FIG. 9, for example. FIG. 9 is a diagram for explaining the read out of the logic value held in the monitoring storage element 5. In FIG. 9, a general-purpose computer 61 has a known structure including a CPU 62, a storage part 63, a display part 64, an interface (I/F) part 65, and an input part 66 that are connected via a bus 67. For example, the storage part 63 may be formed by a semiconductor memory device, a disk drive, and the like. The storage part 63 may be externally coupled to the computer 61. For example, the input part 66 may be formed by a keyboard, and the like. The I/F part 65 of the computer 61 is coupled to a JTAG (Joint Test Action Group) part 101 within the FPGA 1 via a cable 71 and a JTAG connector 72. For example, the JTAG connector 72 and the JTAG part 101 have a standardized structure in conformance with the standard IEEE 1149.1 for a boundary scan test or a test access port used to inspect and debug semiconductor integrated circuits and substrates. The JTAG part 101 successively outputs the logic value read from the monitoring storage element 5 within the analyzing target region to the JTAG connector 72 in response to an instruction from the computer 61. For the sake of convenience, FIG. 9 only illustrates the monitoring storage elements 5 within the analyzing target region from which the logic value is to be read out.

It is assumed for the sake of convenience that at least a program for causing the CPU 62 to execute the step S4 illustrated in FIG. 4 is stored in the storage part 63. The program may be installed in the storage part 63 from a computer-readable storage medium (not illustrated) or, the storage part 63 itself may form the computer-readable storage medium that stores the program. The storage part 63 stores, in addition to the program, various kinds of data including intermediate data of operations or computations executed by the CPU 62, and data of files which will be described later. The program stored in the storage part 63 is executed by the CPU 62 based on information and instructions input by the operator from the input part 66. Data, such as messages, operation menus, and analysis results, are displayed on the display part 64 with respect to the operator. The computer 61, that is, the CPU 62, reads out the logic value held in the monitoring storage element 5 within the analyzing target region via the JTAG part 101, in a state where the analyzing target logic circuit within the FPGA 1 is operating, using the known boundary scan method.

A step S5 carries out a file output process that outputs a file including the threshold voltage Vth set in the step S2, the logic value read out from each monitoring storage element 5, and position information of each monitoring storage element 5 that is the read target. Because the connection relationship among the monitoring storage elements 5 is known in advance from the design data of the FPGA 1, the position information of each monitoring storage element 5 may be detected from the connection relationship and the order with which the logic values are read out from the monitoring storage elements 5. More particularly, the position information of each monitoring storage element 5 may be detected by judging a vertical position of each monitoring storage element 5 along a vertical direction in a plan view of the FPGA 1 (that is, the position of the column (ith column) in the matrix arrangement where each monitoring storage element 5 is located), and judging a horizontal position of each monitoring storage element 5 along a horizontal direction in the plan view of the FPGA 1 (that is, the position of the row (jth row) in the matrix arrangement where each monitoring storage element 5 is located). For example, the file that is output by the file output process may be stored in a storage part within the external apparatus or, a storage part coupled to the external apparatus, in a manner accessible and readable from the external apparatus. When the computer 61 illustrated in FIG. 9 is used as the external apparatus, the file may be stored in the storage part 63, for example.

When the step S5 carries out the file output process, if the FPGA 1 includes another analyzing target region or, if the threshold voltage Vth of each monitoring storage element 5 is to be changed and set to another value, the process may return to the step S1 to carry out a process similar to that described above.

A step S6 reads the file stored in the storage part from the external apparatus, and carries out an analyzing process to specify the extent of the effect of noise and the location where the effect of the noise is greater than or equal to a predetermined amount within the FPGA 1. More particularly, the extent of the effect of noise and the location where the effect of the noise is greater than or equal to the predetermined amount within the FPGA 1 are specified, based on the threshold voltage Vth within the read out file, the monitoring storage element 5 from which the read out logic value is different from (that is, in an inverted relationship to) the logic value set in the step S1, and the position information of each monitoring storage element 5 that is the read out target. Whether the noise within the FPGA 1 is greater than or equal to the predetermined amount may be determined from the set threshold voltage Vth.

A step S7 carries out, by the external apparatus, a constraint condition creating process which creates the constraint condition of the placement of the constituent elements of the FPGA 1 and the routing within the FPGA 1, based on the results of the analyzing process in the step S6.

A step S8 places the noise source farther away from the vicinity (or periphery) of the monitoring storage element 5 that is easily affected by the noise, by carrying out the re-placement process to modify and re-place the placement of the constraint condition that is already determined in the step S7 or, the re-routing process to modify and re-route the routing of the constraint condition that is already determined in the step S7, in order to reduce the noise, that is, in order to suppress the clock jitter. Accordingly, in the case illustrated in FIG. 7, the amount of noise Ns2 is flattened so that the noise Ns2 does not become less than the threshold voltage Vth6.

Figure 10:
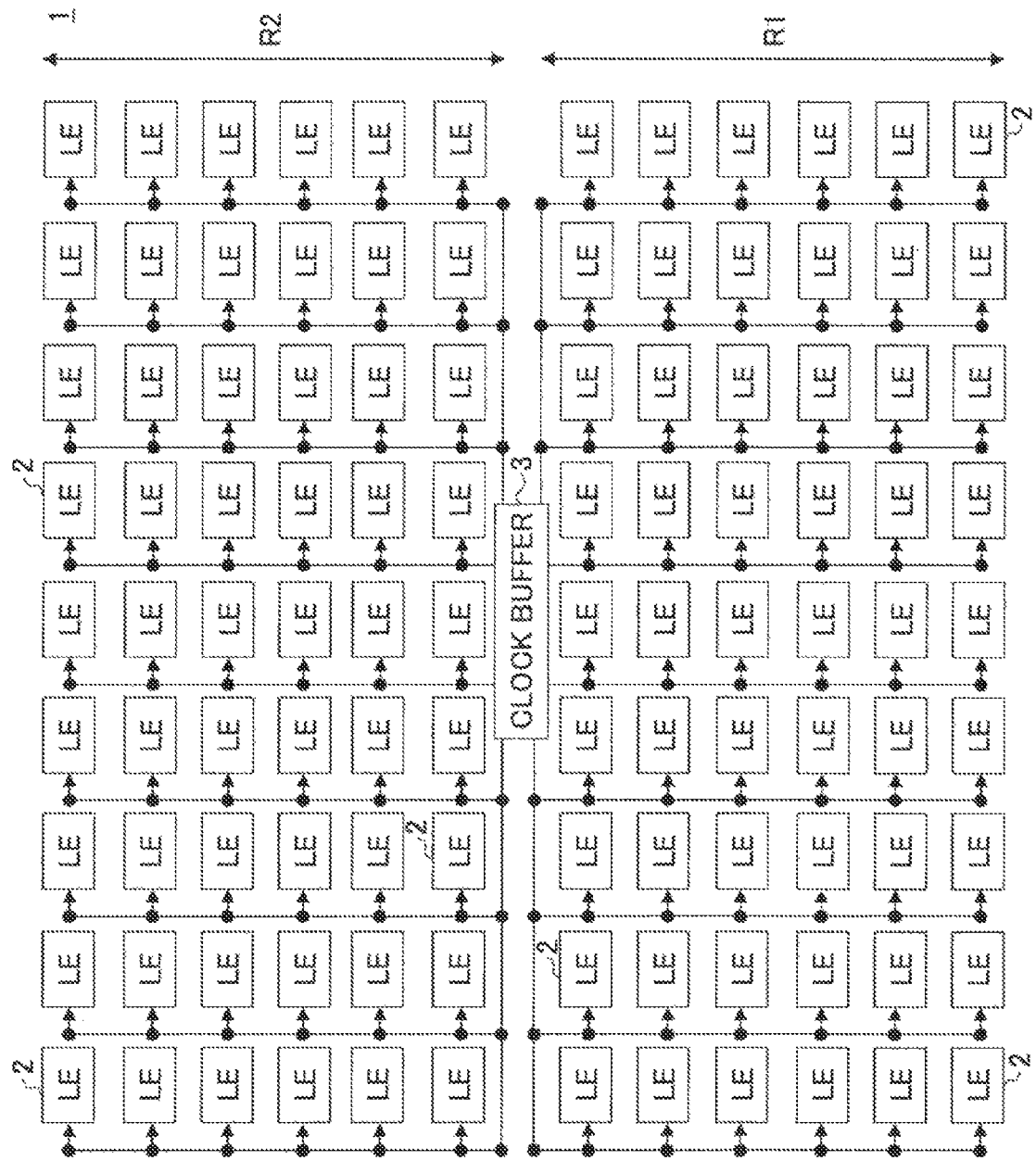
FIG. 10 is a diagram for explaining a modification in clock routing.
Figure 11:
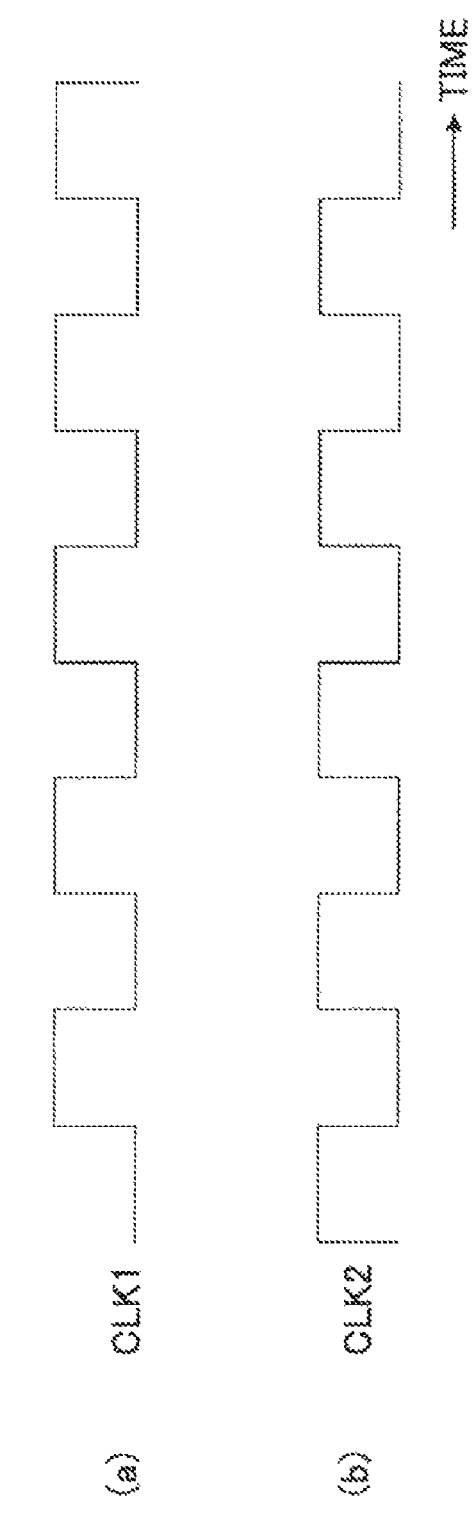
FIG. 11 is a timing chart for explaining a phase relationship of the clock depending on the position of the logic element.
Figure 12:
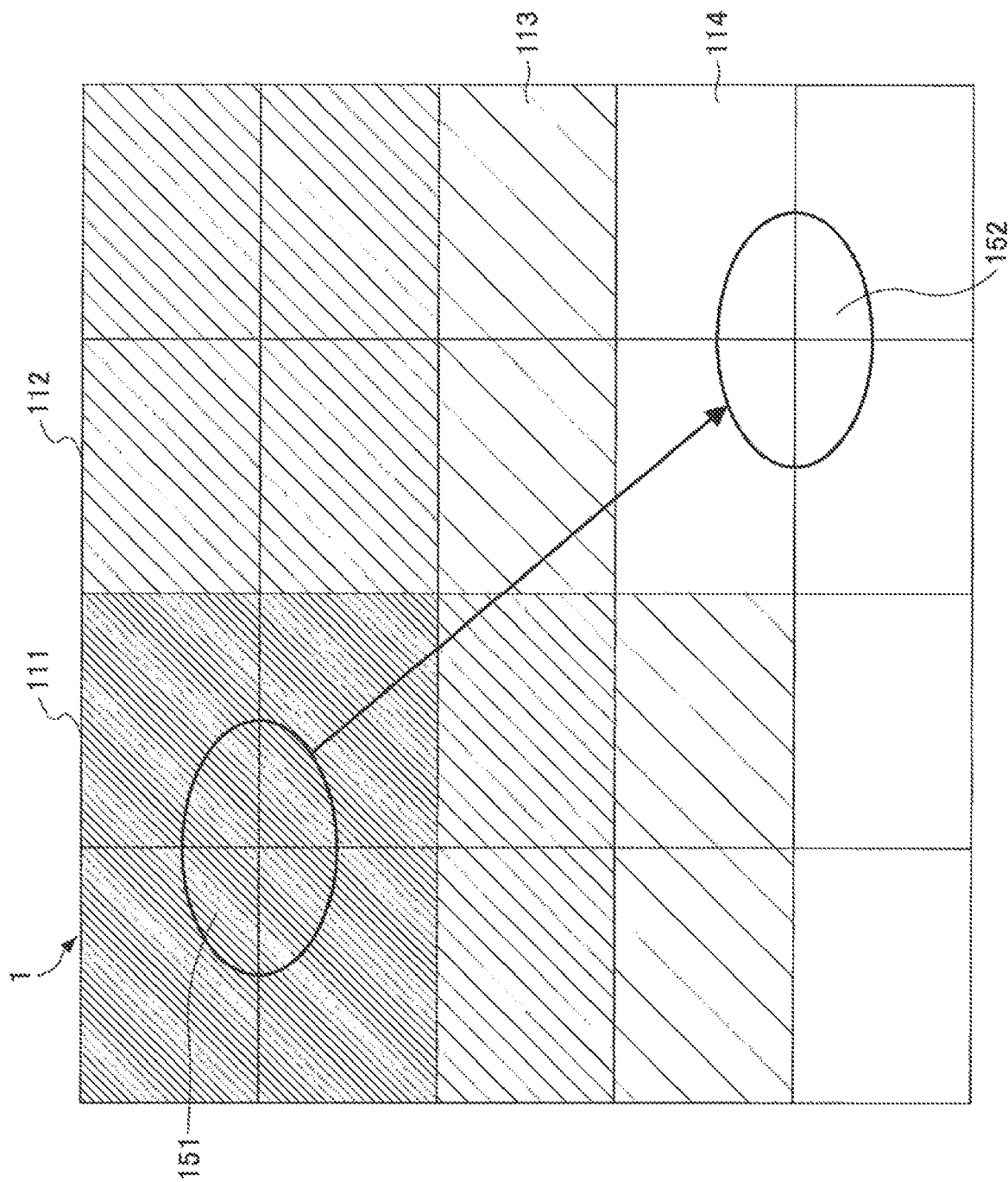
FIG. 12 is a diagram for explaining a modification of placement of the logic circuit.

FIGS. 10 through 12 are diagrams for explaining an example of the process of the step S8. FIG. 10 is a diagram for explaining a modification in clock routing. In FIG. 10, those parts that are the same as those corresponding parts in FIG. 1 are designated by the same reference numerals, and a description thereof will be omitted. FIG. 11 is a timing chart for explaining a phase relationship of the clock depending on the position of the LE. FIG. 12 is a diagram for explaining a modification of placement of the logic circuit.

FIG. 10 illustrates an example in which the step S8 carries out the re-routing process to modify and re-route the routing of the constraint condition that is already determined in the step S7. In the FPGA 1 illustrated in FIG. 10, a group of LEs 2 on the lower side of the clock buffer 3 is placed within a lower region R1, and a group of LEs 2 on the upper side of the clock buffer 3 is placed within an upper region R2. In the re-routing process, the clock lines of one system illustrated in FIG. 1 are modified into the clock lines of two systems illustrated in FIG. 10, so that the noise source is placed farther away from the vicinity of the monitoring storage elements 5 that are easily affected by the noise. In addition, the phase of a clock CLK1 illustrated in FIG. 11(a) that is input to the LEs 2 within the lower region R1, and the phase of a clock CLK2 illustrated in FIG. 11(b) that is input to the LEs 2 within the upper region R2 are inverted relative to each other. Hence, even if the value held in the monitoring storage element 5 changes as illustrated in FIG. 6 in a case where the LEs 2 in the vicinity of the clock buffer 3 are used for the operation of the FPGA 1 in the state before the re-routing process is carried out, the value held in the corresponding monitoring storage element 5 changes as illustrated in FIG. 7 in the state after the re-routing process is carried out. Consequently, the noise may be suppressed satisfactorily, and the clock jitter may be suppressed.

FIG. 12 illustrates an example in which the step S8 carries out the re-placement process to modify and re-place the placement of the constraint condition that is already determined in the step S7. In FIG. 12, the illustration of the LEs 2 and the clock buffer 3 within the FPGA 1 is omitted. The FPGA 1 illustrated in FIG. 12 includes, in an order having the largest amount of noise, regions 111, 112, 113, and 114. Hence, FIG. 12 also illustrates a noise distribution within the FPGA 1. Because the analyzing target logic circuit is placed in a part 151 within the region 111 where the amount of noise is large, the re-placement process re-places this analyzing target logic circuit into a part 152 within the region 114 where the amount of noise is small, in order to place the noise source farther away from the vicinity of the monitoring storage element 5 that is easily affected by the noise. Accordingly, even if the value held in the monitoring storage element 5 changes as illustrated in FIG. 6 in a case where the LEs 2 in the vicinity of the clock buffer 3 within the part 151 are used for the operation of the FPGA 1 in the state before the re-placement process is carried out, the value held in the corresponding monitoring storage element 5 changes as illustrated in FIG. 7 in the state after the re-placement process is carried out to re-place the clock buffer 3 into the part 152 within the region 114. Consequently, the noise may be suppressed satisfactorily, and the clock jitter may be suppressed.

The analyzing process of the step S6, the constraint condition creating process of the step S7, and the re-placement process and the re-routing process of the step S8 may each be carried out automatically by the external apparatus or, may each be carried out semi-automatically in response to interactive operations between the operator and the external apparatus.

A step S9 creates configuration data of the FPGA 1 including the analyzing target logic circuit, based on the results of the constraint condition creating process of the step S7 and the re-placement process and the re-routing process of the step S8. A step S10 decides whether or not to end the analyzing process related to the noise of the FPGA 1 by the external apparatus, depending on whether the FPGA 1 includes other logic circuits that are to be analyzed. The process returns to the step S1 if the decision result in the step S10 is NO. On the other hand, if the FPGA 1 includes no other logic circuit to be analyzed, the decision result in the step S10 is YES and the analyzing process related to the noise of the FPGA 1 ends.

A new FPGA 1 may be created, which reflects the results of the re-placement process and the re-routing process of the step S8. In this case, the processes of the steps S1 through S10 may of course be repeated with respect to the new FPGA 1, in order to optimize the structure of the FPGA 1 depending on the use or needs of the FPGA 1.

By carrying out the analyzing process related to the noise of the FPGA 1 in the manner described above, the clock jitter of the FPGA 1 may be positively suppressed in a relatively short time at a relatively low cost.

Figure 13:
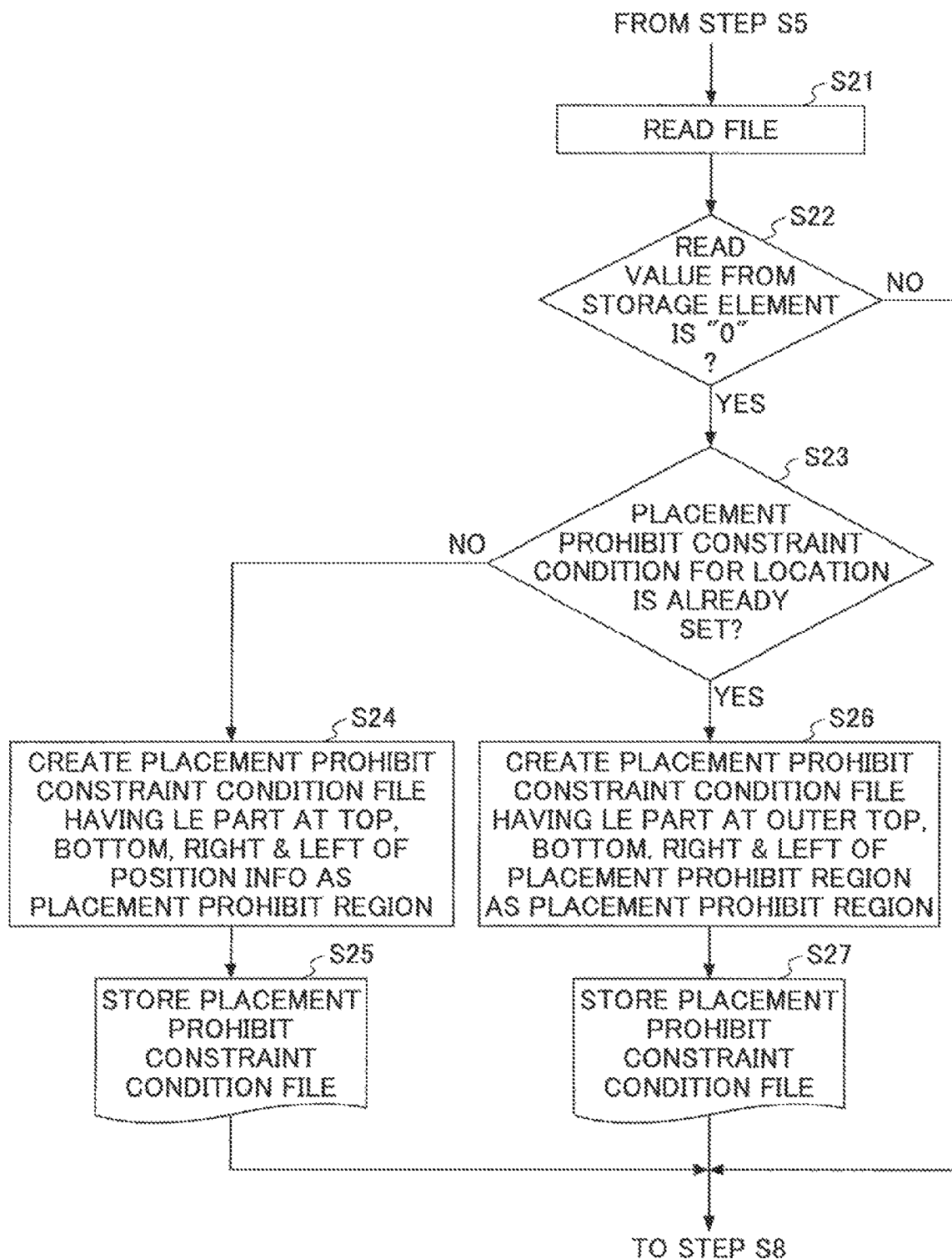
FIG. 13 is a flow chart for explaining a process for a case where processes of steps S6 and S7 illustrated in FIG. 8 are carried out automatically.

FIG. 13 is a flow chart for explaining a process for a case where the processes of the steps S6 and S7 illustrated in FIG. 8 are carried out automatically by the external apparatus. In this example, it is assumed for the sake of convenience that the computer 61 illustrated in FIG. 9 is used as the external apparatus, that is, steps S21 though S27 illustrated in FIG. 13 are executed by the CPU 62 of the computer 61.

After the step S5 illustrated in FIG. 8, the step S21 illustrated in FIG. 13 reads out the file stored in the storage part 63. The step S22 decides whether the read out file includes the monitoring storage element 5 from which the logic value "0" is read out. The process advances to the step S8 illustrated in FIG. 8 if the decision result in the step S22 is NO. If the decision result in the step S22 is YES, the step S23 decides, from the position information of each monitoring storage element 5 from which the logic value "0" is read out, whether a placement prohibit constraint condition is already set for the region (or location or position) where each monitoring storage element 5 from which the logic value "0" is read out is placed.

If the decision result in the step S23 is NO, the step S24 creates, from the position information of each monitoring storage element 5 from which the logic value "0" is read out, a file of the placement prohibit constraint condition (hereinafter referred to as a placement prohibit constraint condition file). This placement prohibit constraint condition file created in the step S24 sets the positions of the LEs 2 provided on top, bottom, right and left (that is, in the vicinity) of each monitoring storage element 5 from which the logic value "0" is read out, in the plan view of the FPGA 1, to a placement prohibit region which prohibits placement therein of the LEs 2 that operate during the operation of the analyzing target logic circuit. The step S25 stores the placement prohibit constraint condition file created in the step S24 into the storage part 63 of the computer 61, and the process advances to the step S8 illustrated in FIG. 8.

On the other hand, if the decision result in the step S23 is YES, the step S26 creates a file of the placement prohibit constraint condition (hereinafter referred to as a placement prohibit constraint condition file). This placement prohibit constraint condition file created in the step S26 sets the positions of the LEs provided on top, bottom, right and left (that is, in the vicinity) of the placement prohibit region indicated by the placement prohibit constraint condition to the placement prohibit region which prohibits placement therein of the LEs 2 that operate during the operation of the analyzing target logic circuit. The step S27 stores the placement prohibit constraint condition file created in the step S26 into the storage part 63 of the computer 61, and the process advances to the step S8 illustrated in FIG. 8.

Therefore, by automatically carrying out the processing procedure of FIG. 8, the analysis time required, the hardware resources required, and the analysis cost may be reduced considerably compared to the case where the chip simulation is carried out. In addition, even in a case where the effect of the noise is relatively large during operation of the analyzing target logic circuit, it is unnecessary to re-develop the platform of the logic circuit by taking measures such as increasing the amount of capacitors connected to the logic circuit. In other words, by using the existing platform of the logic circuit, the disclosed clock jitter suppression method may suppress the clock jitter by specifying the location within the logic circuit where the effect of the noise is relatively large (that is, not negligible), while avoiding the cost from increasing due to re-development, simulation and the like. Furthermore, the results of the analyzing process are accurate because the analyzing process is carried out by feeding back the measured results of the actual application of the logic circuit.

In each embodiment described above, the semiconductor integrated circuit that is the analyzing target is provided within a semiconductor chip, such as a LSI (Large Scale Integrated) circuit. However, the analyzing target may be a semiconductor integrated circuit that is mounted on a printed circuit board or the like together with other parts.

Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A clock jitter suppression method for suppressing clock jitter in a semiconductor integrated circuit having a clock buffer configured to receive a clock, comprising:
   setting an arbitrary logic value to storage elements that are coupled to the clock buffer;
   variably setting a threshold voltage of the storage elements;
   reading a value held in the storage elements in a state where an analyzing target circuit within the semiconductor integrated circuit operates;
   performing an analyzing process to specify an extent of an effect of noise in a power supply voltage or a ground voltage of the clock buffer and to specify a location where the effect of the noise is greater than or equal to a predetermined amount within the semiconductor integrated circuit, based on the threshold voltage and position information of the storage element from which the read out value has an inverted relationship to the set arbitrary logic value and each storage element that is a read target;
   performing a constraint condition creating process to create a constraint condition for placement of constituent elements of the semiconductor integrated circuit and routing within the semiconductor integrated circuit based on results of the analyzing process; and
   performing one of a re-placement process to modify and re-place the placement of the constraint condition and a re-routing process to modify and re-route the routing of the constraint condition, in order to reduce the noise.

2. The clock jitter suppression method as claimed in claim 1, wherein said performing the constraint condition creating process and said performing one of the re-placement process and the re-routing process are executed by a computer.

3. The clock jitter suppression method as claimed in claim 2, wherein said setting, said variably setting, said reading, and said performing the analyzing process are executed by the computer.

4. The clock jitter suppression method as claimed in claim 2, wherein:
   each storage element includes a buffer applied with the power supply voltage of the clock buffer, and a flip-flop having a reset terminal applied with an output of the buffer of the storage element; and
   said variably setting variably sets the threshold voltage by variably setting a reverse bias voltage applied to the buffer of the storage element.

5. The clock jitter suppression method as claimed in claim 2, wherein said performing one of the re-placement process and the re-routing process places a noise source farther away from a vicinity of the storage element easily affected by the noise.

6. The clock jitter suppression method as claimed in claim 2, wherein said setting, said variably setting, said reading, and said performing the analyzing process are repeated with respect to a new semiconductor integrated circuit that is created by reflecting results of said performing one of the re-placement process and the re-routing process, in order to optimize a structure of the new semiconductor integrated circuit.

7. A non-transitory computer-readable storage medium that stores a program which, when executed by a computer, causes the computer to perform a process of suppressing clock jitter in a semiconductor integrated circuit having a clock buffer configured to receive a clock, said process comprising:
   a setting procedure causing the computer to set an arbitrary logic value to storage elements that are coupled to the clock buffer;
   a variably setting procedure causing the computer to variably set a threshold voltage of the storage elements;
   a reading procedure causing the computer to read a value held in the storage elements in a state where an analyzing target circuit within the semiconductor integrated circuit operates;
   an analyzing procedure causing the computer to perform an analyzing process to specify an extent of an effect of noise in a power supply voltage or a ground voltage of the clock buffer and to specify a location where the effect of the noise is greater than or equal to a predetermined amount within the semiconductor integrated circuit, based on the threshold voltage and position information of the storage element from which the read out value has an inverted relationship to the set arbitrary logic value and each storage element that is a read target;

a creating procedure causing the computer to perform a constraint condition creating process to create a constraint condition for placement of constituent elements of the semiconductor integrated circuit and routing within the semiconductor integrated circuit based on results of the analyzing process; and a performing procedure causing the computer to perform one of a re-placement process to modify and re-place the placement of the constraint condition and a re-routing process to modify and re-route the routing of the constraint condition, in order to reduce the noise.

8. The non-transitory computer-readable storage medium as claimed in claim 7, wherein:

each storage element includes a buffer applied with the power supply voltage of the clock buffer, and a flip-flop having a reset terminal applied with an output of the buffer of the storage element; and said variably setting procedure causes the computer to variably set the threshold voltage by variably setting a reverse bias voltage applied to the buffer of the storage element.

9. The non-transitory computer-readable storage medium as claimed in claim 8, wherein said performing procedure causes the computer to place a noise source farther away from a vicinity of the storage element easily affected by the noise.

10. The non-transitory computer-readable storage medium as claimed in claim 7, wherein said performing procedure causes the computer to place a noise source farther away from a vicinity of the storage element easily affected by the noise.

11. The non-transitory computer-readable storage medium as claimed in claim 7, wherein said setting procedure, said variably setting procedure, said reading procedure, and said analyzing procedure are repeated with respect to a new semiconductor integrated circuit that is created by reflecting results of said performing procedure, in order to optimize a structure of the new semiconductor integrated circuit.

* * * * *